(12) United States Patent
Tamaoki et al.

(10) Patent No.: US 6,197,460 B1
(45) Date of Patent: Mar. 6, 2001

(54) REWRITABLE, HEAT SENSITIVE, COLOR IMAGE RECORDING MEDIUM AND IMAGE RECORDING METHOD USING SAME

(75) Inventors: Nobuyuki Tamaoki; Alexander Parfenov; Atsushi Masaki; Hiro Matsuda, all of Tsukuba (JP)

(73) Assignee: Director-General of Agency of Industrial Science and Technology (JP)

( * ) Notice: Subject to any disclaimer, the term of this patent is extended or adjusted under 35 U.S.C. 154(b) by 0 days.

(21) Appl. No.: 09/072,695

(22) Filed: May 6, 1998

Related U.S. Application Data

(63) Continuation-in-part of application No. 09/040,664, filed on Mar. 18, 1998, now abandoned.

(30) Foreign Application Priority Data

May 8, 1997 (JP) .................................................. 9-134338

(51) Int. Cl.[7] ............................. G03C 1/73; G02F 1/133; G11B 7/24
(52) U.S. Cl. ................................. 430/20; 430/19; 430/42; 349/2; 359/3; 369/275.2; 428/1.1
(58) Field of Search ........................ 252/299.01, 299.62, 252/299.7; 349/2; 264/1.33; 374/161, 162; 430/20, 19, 42; 369/275.2; 359/3; 428/1.1

(56) References Cited

U.S. PATENT DOCUMENTS

| | | |
|---|---|---|
| 3,585,381 | 6/1971 | Hodson et al. ........................ 349/21 |
| 3,732,119 | 5/1973 | Churchill et al. ..................... 374/161 |
| 3,789,225 * | 1/1974 | Leder . |
| 4,064,872 | 12/1977 | Caplan ................................. 374/162 |
| 6,103,431 * | 8/2000 | Tamaoki et al. ........................ 430/20 |

FOREIGN PATENT DOCUMENTS

| | | |
|---|---|---|
| 476351 | 6/1967 | (CH) . |
| 2039153 | 4/1970 | (FR) . |
| 6-273712 * | 9/1994 | (JP) . |

OTHER PUBLICATIONS

WPIDS 94–351868, 1994.*
CAPLUS 1997: 759946.*
Tamaoki et al Rewritable Full–Color Recording on a Thin Solid film of a Cholesteric Low–Molecular–Weight Compound, Advanced Materials, vol. 9, No. 14, Nov. 14, 1997, pp. 1102–1104.

* cited by examiner

*Primary Examiner*—Shean C. Wu
(74) *Attorney, Agent, or Firm*—Lorusso & Loud

(57) ABSTRACT

A rewritable, heat sensitive, color image recording medium having a pair of opposed substrate sheets at least one of which is transparent, and a heat sensitive layer interposed between the substrate sheets and containing a cholesteric liquid crystal compound having a molecular weight of not greater than 2,000 and a glass transition point of at least 35° C. A color image is formed on the recording medium by varying imagewise the temperature of the heat sensitive layer from a first temperature to a second temperature such that the cholesteric liquid crystal compound assumes a cholesteric liquid crystal phase at at least one of the first and second temperatures. The image is fixed by rapidly cooling the recording medium to a temperature lower than the glass transition point of the cholesteric liquid crystal compound.

6 Claims, No Drawings

REWRITABLE, HEAT SENSITIVE, COLOR IMAGE RECORDING MEDIUM AND IMAGE RECORDING METHOD USING SAME

CROSS REFERENCE TO RELATED APPLICATION

The present application is a continuation-in-part of U.S. Application Ser. No. 09/040,664 filed Mar. 18, 1998 abandoned and entitled "REWRITABLE, HEAT SENSITIVE, COLOR IMAGE RECORDING MEDIUM AND IMAGE RECORDING METHOD USING SAME".

BACKGROUND OF THE INVENTION

This invention relates to a rewritable heat sensitive, color image recording medium and to a method of recording an image using the recording medium.

There is a known rewritable, thermosensitive recording medium having a thermosensitive layer containing a derivative of a long chain alkyl carboxylic acid, such as a behinic acid. The thermosensitive layer can assume a white color state and a transparent state depending upon thermal hysteresis thereof. Thus, when the thermosensitive layer backed by a colored substrate is heated imagewise, a white image is obtainable with the color of the substrate as a background. No rewritable, thermosensitive recording media capable of giving colored images are known.

SUMMARY OF THE INVENTION

It is, therefore, an object of the present invention to provide a rewritable, heat sensitive recording medium adapted for giving a color image.

Another object of the present invention is to provide a method of forming a color image using the above recording medium.

In accomplishing the foregoing objects, there is provided in accordance with one aspect of the present invention a rewritable, heat sensitive, color image recording medium comprising a pair of opposed substrate sheets at least one of which is transparent, and a heat sensitive layer interposed between said substrate sheets and comprising a cholesteric liquid crystal compound having a molecular weight of not greater than 2,000 and a glass transition point of at least 35° C.

In another aspect, the present invention provides a method of recording a color image, comprising the steps of:

(a) providing a heat sensitive, color image recording medium comprising a pair of opposed substrate sheets at least one of which is transparent, and a heat sensitive layer interposed between said substrate sheets and comprising a cholesteric liquid crystal compound having a molecular weight of not greater than 2,000 and a glass transition point of a least 35° C.;

(b) varying imagewise the temperature of said heat sensitive layer from a first temperature to a second temperature such that said cholesteric liquid crystal compound assumes a cholesteric liquid crystal phase at at least one of said first and second temperatures, thereby forming an image; and (c) then rapidly cooling said recording medium obtained in step (b) to a temperature lower than said glass transition point to fix said image.

DETAILED DESCRIPTION OF THE PREFERRED EMBODIMENTS OF THE INVENTION

The recording medium according to the present invention has a pair of opposed substrates each generally in the form of a sheet, a film or a plate, and a heat sensitive layer interposed between the substrates. Each of the substrates may be flat or curved and may be rigid or flexible. It is important that at least one of the substrate should be transparent so that the heat sensitive layer can see through the transparent substrate. The transparent substrate may be formed of, for example, a plastic material or a glass. The opaque substrate may be made of, for example, a paper, a metal or a plastic material. If desired, a light or heat reflecting layer or a light (laser beam) absorbing layer may be interposed between the heat sensitive layer and one of the substrates that need not be transparent.

The heat sensitive layer comprises a cholesteric liquid crystal compound having a molecular weight of not greater than 2,000, preferably 500–1,500, more preferably 700–1,200 and a glass transition point of at least 35° C., preferably at least 50° C., more preferably 70–110° C.

The cholsteric liquid crystal compound represented by the formula:

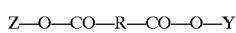

wherein Z and Y are each independently selected from the group consisting of a cholesteryl group, a hydrogen atom and an alkyl group with the proviso that at least one of Z and Y stands for a cholesteryl group, and R stands for a divalent hydrocarbyl group having 2–20 carbon atoms may be suitably used for the purpose of the present invention. The divalent hydrocarbyl group R may be, for example, one which is represented by the formula:

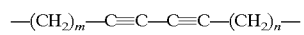

wherein m and n are each independently an integer of 1 or more with the proviso that the total of m and n does not exceed 16.

Illustrative of cholesteric liquid crystal compounds are dicholesteryl 10,12-docosadiynedioate, dicholesteryl eicosadioate, cholesteryl 10,12-pentacosadiynoate, dicholesteryl dodecadicate and dicholesteryl 12,14-hexacosadiynedioate.

The heat sensitive layer may contain one or more additives such as a pigment, a dye and an oxidation resisting agent. The content of the cholesteric liquid crystal compound in the heat sensitive layer is preferably at least 90% by weight. The thickness of the sensitive layer is not specifically limited, but is generally in the range of 1–100 μm.

The recording medium may be prepared by, for example, forming a molten cholesteric liquid crystal compound layer on one of the substrates, followed by placement of the other substrate on the molten cholesteric liquid crystal compound layer. Alternatively, a molten cholesteric liquid crystal compound may be filled in a thin gap between opposed substrates using capillary action or suction force.

The recording medium thus constructed gives a color image when the temperature of the heat sensitive layer is changed imagewise from a first temperature to a second temperature such that the cholesteric liquid crystal compound assumes a cholesteric liquid crystal phase at at least one of the first and second temperature.

The cholesteric liquid crystal compound is colorless or transparent in a non-cholesteric liquid phase (such as a glass state, a crystal phase or an isotropic phase), but is colored in a cholesteric liquid crystal phase. The color of the compound in the cholesteric liquid crystal phase varies depending upon the temperature due to a change in the molecular arrangement.

Thus, when the temperature of the heat sensitive layer is changed such that the phase of the cholesteric liquid crystal compound is converted from a cholesteric liquid crystal phase to a non-cholesteric liquid crystal phase or vice versa, the color thereof changes from a colored state (e.g. blue) to a colorless state (e.g. white) or vice versa. Further, when the docosadiynedioate (molecular weight: 1,099.8, glass transition point: 80° C.) having the following chemical structure:

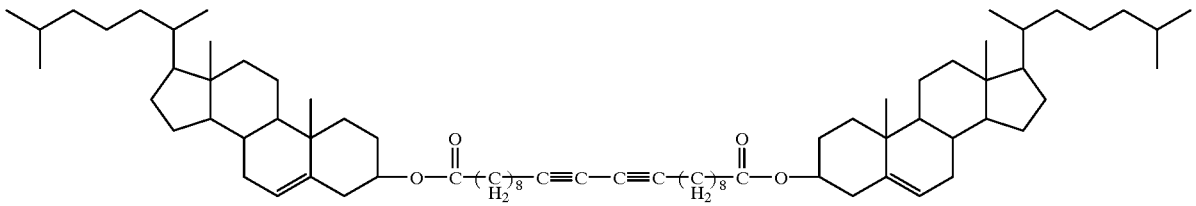

temperature of the heat sensitive layer is changed while maintaining the cholesteric liquid crystal compound in the cholesteric liquid crystal phase, the color thereof changes (e.g. from blue to red) depending upon the temperature.

The temperature of the heat sensitive layer may be changed imagewise from the first temperature to the second temperature by any desired method such as by heating the recording medium with a laser beam, a thermal head, a heated roll or a heated stamp or by cooling the recording medium with a cold roll or cooling with a cold stamp.

The recording medium in which an image has been formed by changing imagewise the heat sensitive layer from the first temperature to the second temperature is then rapidly cooled to a temperature lower than the glass transition point of the cholesteric liquid crystal compound to fix the image. The fixation of the color of heat sensitive layer is considered to be due to the phase conversion from the cholesteric liquid crystal phase to a glass cholesteric liquid crystal phase. The rapid cooling may be performed by any suitable method such as by immersing the medium in a cold liquid or a cold gas environment or by contacting the medium with a cold gas blow or a cold solid surface.

The color fixation by the cooling of the recording medium is preferably carried out at a rate of at least 1° C./second, more preferably at least 10° C./second, most preferably at least 50° C./second. Too low a cooling rate below 1° C./second might cause a color change during the fixation. For the same reasons, it is advisable to initiate the color fixation as soon as the color development has been completed. Namely, when the colored recording medium is allowed to stand for a certain period of time, e.g. more than 10 seconds at room temperature, the color thereof changes before fixation, although the time period varies depending upon the ambient temperature and the glass transition point of the cholesteric liquid crystal compound used.

The heat sensitive recording medium may further comprise a protecting layer, a backing layer, etc., as desired for utilization thereof such as for labels and magnetic tickets. In the case of a label, for example, an adhesive layer is formed on the back side of the substrate, with a disposable backing sheet attached to the adhesive layer. In the case of a magnetic ticket, a magnetic recording layer containing a ferromagnetic substance and a binder is substituted for the above-mentioned disposable backing sheet.

The following examples will further illustrate the present invention.

EXAMPLE 1

Between a pair of colorless transparent glass plates each having a thickness of 0.18 mm, dicholesteryl 10,12- was placed and the whole assembly was heated to 130° C. and then gradually cooled to room temperature to obtain a white recording medium having a thickness of the dicholesteryl 10,12-docosadiynedioate layer (cholesteric liquid crystal layer) of 20 μm.

The recording medium when placed on a hot stage maintained at 115° C. assumed a blue color as a whole. When a rubber stamp provided with mirror image letters was contacted with the blue recording medium, the contacted portion was cooled to 95° C. and assumed a green color. The recording medium having a green image with a blue background was immediately immersed in ice water and cooled at a rate of about 200° C./second. The cooled recording medium was then allowed to stand at room temperature for 3 months. It was found that no change in color caused in the green letter image and the blue background of the recording medium. Similarly, when the cooled recording medium was stored at 75° C. for 2 weeks, no color changes were observed.

EXAMPLE 2

A heat sensitive recording medium was prepared in the same manner as that in Example 1, except that one side of one of the glass plates was coated with a black paint and contacted with the cholesteric liquid crystal layer. The recording medium was placed on a hot stage maintained at 115° C. so that the whole area assumed a blue color. Then the blue recording medium was irradiated imagewise with a neodymium YAG laser beam (wavelength: 532 nm) from a side of the transparent glass plate, thereby obtaining an orange image in a blue background. The recording medium was immediately immersed in ice water to fix the image. The image was found to be stable when allowed to stand at room temperature for 3 months.

EXAMPLE 3

A white recording medium was prepared in the same manner as that in Example 1. A line pattern was written on the recording medium with a thermal head having a head temperature of more than 130° C. A transparent line was observed in a moment and the line changes blue. As soon as the blue line was obtained, the recording medium was immersed in ice water. The blue image in the white background was found to be stable when allowed to stand at room temperature for 3 months.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A rewritable, heat sensitive, color image recording medium comprising a pair of opposed substrate sheets at least one of which is transparent, and a heat sensitive layer interposed between said substrate sheets and comprising a cholesteric liquid crystal compound having a molecular weight of not greater than 2,000 and a glass transition point of at least 35° C., wherein said chloesteric liquid crystal compound is represented by the formula:

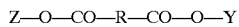

Z—O—CO—R—CO—O—Y wherein Z and Y are each independently selected from the group consisting of a cholesteryl group, a hydrogen atom and an alkyl group with the proviso that at least one of Z and Y stands for a cholesteryl group, and R stands for a divalent hydrocarbyl group having 2–20 carbon atoms.

2. A recording medium as set forth in claim 1, wherein said divalent hydrocarbyl group is represented by the formula:

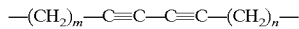

$-(CH_2)_m-C\equiv C-C\equiv C-(CH_2)_n-$ wherein m and n are each independently an integer of 1 or more with the proviso that the total of m and n does not exceed 16.

3. A method of recording a color image, comprising the steps of:

(a) providing a heat sensitive, color image recording medium comprising a pair of opposed substrate sheets at least one of which is transparent, and a heat sensitive layer interposed between said substrate sheets and comprising a cholesteric liquid crystal compound having a molecular weight of not greater than 2,000 and a glass transition point of at least 35° C.;

(b) varying imagewise the temperature of said heat sensitive layer from a first temperature to a second temperature such that said cholesteric liquid crystal compound assumes a cholesteric liquid phase at at least one of said first and second temperatures, thereby forming an image; and (c) then rapidly cooling said recording medium obtained in step (b) to a temperature lower than said glass transition point to fix said image, wherein said cholesteric liquid crystal compound is represented by the formula:

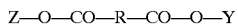

Z—O—CO—R—CO—O—Y wherein Z and Y are each independently selected from the Group consisting of a cholesteryl group, a hydrogen atom an alkyl group with the proviso that at least one of Z and Y stands for a cholesteryl group, and R stands for a divalent hydrocarbyl group having 2–20 atoms.

4. A method as set forth in claim 3, wherein said cooling is at a rate of at least 1° C./minute.

5. A method as set forth in claim 3, wherein said divalent hydrocarbyl group is represented by the formula:

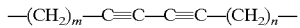

$-(CH_2)_m-C\equiv C-C\equiv C-(CH_2)_n-$ wherein m and n are each independently an integer of 1 or more with the proviso that the total of m and n does not exceed 16.

6. A method as set forth in claim 3, wherein step (b) is performed by a process selected from the group consisting of heating with a laser beam, heating with a thermal head, heating with a heated roll, heating with a heated stamp, cooling with a cold roll or cooling with a cold stamp.

* * * * *